(12) United States Patent
Swinton et al.

(10) Patent No.: US 8,949,176 B2
(45) Date of Patent: Feb. 3, 2015

(54) METHOD AND SYSTEM FOR PROFILE CONTROL

(75) Inventors: Jeffrey Swinton, Mendham, NJ (US);
Steven Whitehead, Hudson, MA (US);
Kay Bechtel, Duncansville, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1386 days.

(21) Appl. No.: 12/181,418

(22) Filed: Jul. 29, 2008

(65) Prior Publication Data

US 2010/0030792 A1    Feb. 4, 2010

(51) Int. Cl.
*G06F 17/00* (2006.01)
*G06F 7/00* (2006.01)
*G06Q 30/00* (2012.01)
*G06Q 30/02* (2012.01)

(52) U.S. Cl.
CPC ............ *G06Q 30/00* (2013.01); *G06Q 30/0256* (2013.01); *G06Q 30/0271* (2013.01)
USPC ............ 707/603; 707/776; 709/209; 709/224

(58) Field of Classification Search
CPC   G06Q 30/00; G06Q 30/0256; G06Q 30/0271
USPC ............ 707/603, 776; 709/209, 224
See application file for complete search history.

(56) References Cited

U.S. PATENT DOCUMENTS

| | | | | |
|---|---|---|---|---|
| 6,018,619 | A * | 1/2000 | Allard et al. ................... | 709/224 |
| 6,539,375 | B2 * | 3/2003 | Kawasaki .............................. | 1/1 |
| 6,826,594 | B1 * | 11/2004 | Pettersen ....................... | 709/203 |
| 2002/0112048 | A1 * | 8/2002 | Gruyer et al. ................. | 709/224 |
| 2003/0161265 | A1 * | 8/2003 | Cao et al. ....................... | 370/229 |
| 2005/0015482 | A1 * | 1/2005 | Blankenship ................. | 709/224 |
| 2005/0114510 | A1 * | 5/2005 | Error et al. .................... | 709/225 |
| 2005/0216844 | A1 * | 9/2005 | Error et al. .................... | 715/745 |
| 2005/0261965 | A1 * | 11/2005 | Eisen et al. ....................... | 705/14 |
| 2006/0123340 | A1 * | 6/2006 | Bailey et al. .................. | 715/700 |
| 2008/0033794 | A1 * | 2/2008 | Ou et al. .......................... | 705/14 |
| 2009/0248494 | A1 * | 10/2009 | Hueter et al. ................... | 705/10 |
| 2011/0004525 | A2 * | 1/2011 | Byrne ......................... | 705/14.67 |

* cited by examiner

*Primary Examiner* — Shew-Fen Lin (57) ABSTRACT

A system and method may include monitoring communications between a user device, a website, and a behavioral tracking provider, capturing user information transmitted during the monitored communications, analyze the user information to determine one or more relationships between the user device, the websites, and the behavioral tracking provider, and outputting the one or more relationships to the user device.

18 Claims, 5 Drawing Sheets

Tracking Options

User Information Table 302

| User Premise ID | Info of Media/Behavioral Tracking Provider | User Info. |
|---|---|---|
| | | |

User Input Information Table 304

| User Premise ID | Info. of Media/Behavioral Tracking Provider | User Info. |
|---|---|---|
| | | |

Enable Filtering for

- ☑ Remove Tracking Option.
- ☑ Security Tool Option.
- ☐ Partial Tracking Option.
- ☐ Custom Tracking Option
- ☐ Full Tracking Option.

METHOD AND SYSTEM FOR PROFILE CONTROL

BACKGROUND INFORMATION

Many advertisers use the Internet and/or television to advertise their products and services by using behavioral targeting. For example, many advertisers may track viewers' behaviors and activities on the Internet and/or watching television. Some viewers, however, may avoid being tracked by a behavioral tracking provider while visiting one or more websites and/or watching one or more television programs. Currently, many advertisers may track users' behaviors and/or activities via one or more mechanisms, including spyware, cookies, interception of traffic etc. In some instances, users may realize they are being tracked, however, in other instances, users may not realize they are being tracked. Many advertisers may acknowledge the tracking of users and may recite the tracking Terms and Conditions deep in a service agreement document. Also, many advertisers may not allow users to opt-out of being tracked and may not educate users how to opt-out of the tracking agreement. Therefore, a method of allowing users to opt-out of being tracked by advertisers may be necessary to ensure users' privacy and/or freedom of choice.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method may include various exemplary embodiments of controlling a passage of user information. The system and method may provide one or more probes within a network to monitor a transmission of user information. Also, the system and method may monitor and/or record the user information accessed through the network. Further, the system and method may process the monitored and/or recorded user information and/or present the processed user information to the user. Additionally, the system and method may allow the user to correct obsolete and/or inaccurate user information and provide feedback to the monitored and/or recorded user information. Moreover, the system and method may allow the user to identify one or more behavior tracking providers tracking the user. Furthermore, the system and method may allow the user to identify one or more media providers associated with the behavior tracking provider to track the user. Finally, the system and method may allow the user to block a passage of the user information and/or remove undesired spyware and/or adware applications.

The description below describes servers, user device, probes, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, media providers, media storage servers) separately. The functions described as being performed at various components may be performed at other components, and the various components may be combined and/or separated. Other modifications also may be made.

Figure 1:
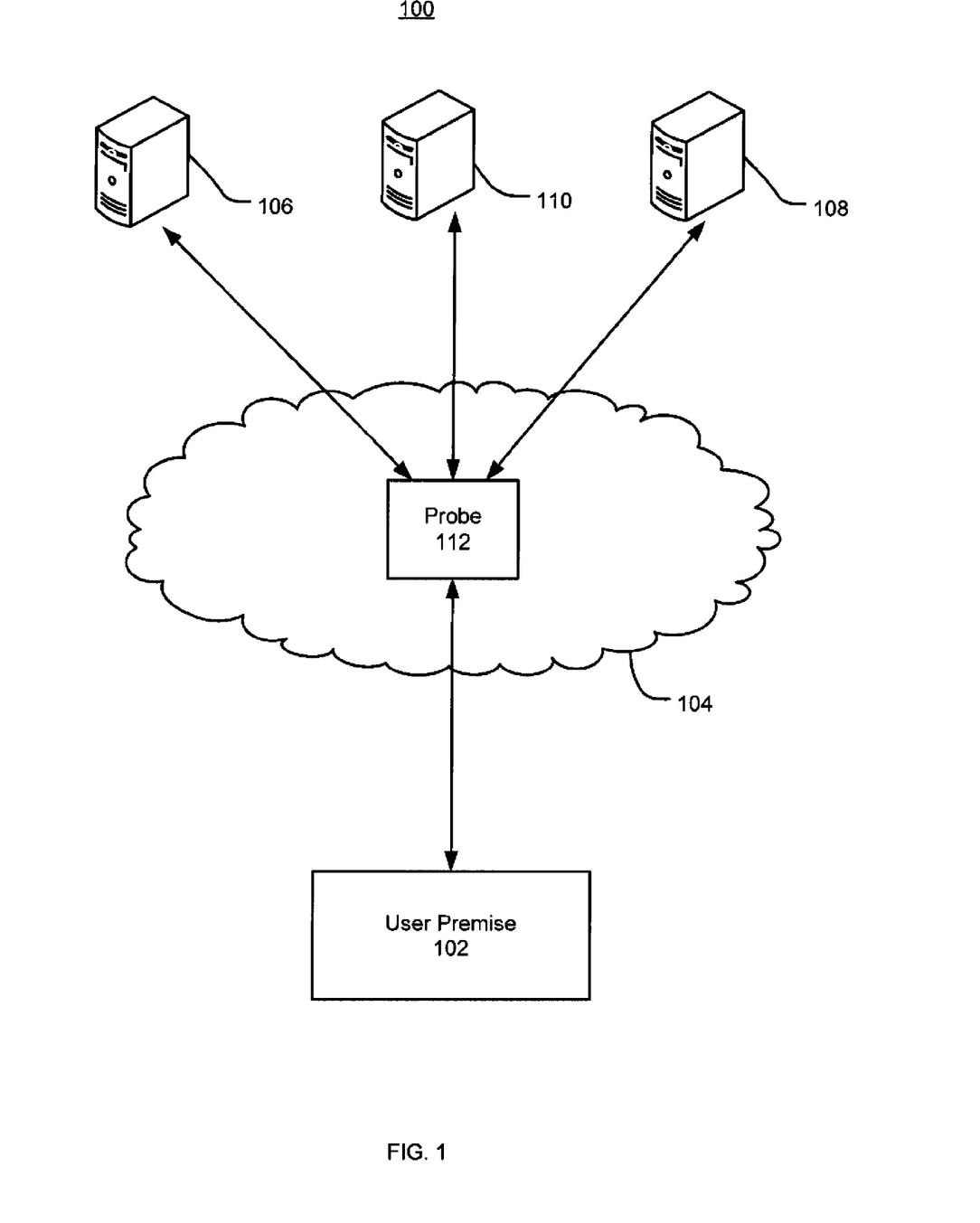
FIG. 1 illustrates a system architecture for controlling a passage of user information in accordance with exemplary embodiments.

FIG. 1 illustrates a system architecture for controlling a passage of user information in accordance with exemplary embodiments. The system 100 may include a user device 102 connected to a media provider 106, a service provider 108, and/or a behavioral tacking provider 110 via a probe 112 located within a network 104. It is noted that system 100 illustrates a simplified view of a user information control system, and other hardware devices and software not depicted may be included in the system 100. It is also noted that the system 100 illustrates only a single user device 102, a single network 104, a single media provider 106, a single service provider 108, a single behavioral tracking provider 110 and a single probe 112. It will be appreciated that multiple instances of these devices may be used. Moreover, the system 100 may include other devices not depicted in FIG. 1. For example, the probe 112 located in the network 104 may monitor and/or record user information to and/or from the user device 102. The probe 112 may monitor and/or record the user information received by the media provider 106 and/or the behavioral tracking provider 110. Also, the probe 112 may identify one or more media providers 106. In addition, the probe 112 may identify one or more behavioral tracking providers 110 associated with the one or more media providers 106. The probe 112 may transmit information associated with the media provider 106 and/or the behavioral tracking provider 110 and/or the user information received by the behavioral tracking provider 110 to the service provider 108. In another exemplary embodiment, the service provider 108 may process and/or store the information associated with the media provider 106 and/or the behavioral tracking provider 110 and the user information received by the behavioral tracking provider 110.

The service provider 108 may present the processed information to the user via an interface. Therefore, the user may control a passage of the user information to the media provider 106 and the behavioral tracking provider 110 and/or provide feedback to the stored information by the service provider 108.

The user device 102 may include a desktop computer, a laptop/notebook, a server or server-like system, a module, a telephone, a television, a satellite communication system, or a communication device, such as a personal digital assistant (PDA), a mobile phone, a smart phone, a remote controller, a personal computer (PC), a workstation, a mobile device, a cellular telephone, a handheld PC, a thin system, a fat system, a network appliance, and/or other communication devices that may be capable of transmitting and/or receiving data.

The network 104 may be a wireless network, a wired network or any combination of wireless, wired and/or other network. The network 104 may be a network associated with the service provider 108 and/or other networks that enable Internet services for the user device 102. For example, network 104 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network. In addition, network 104 may include, without limitation, telephone line, fiber optics, IEEE Ethernet 802.3, long-range wireless radio, wide area network (WAN) such as WiMax, infrared, Bluetooth™, and/or other similar applications, local area network (LAN), global network such as the Internet. Also, network 104 may enable a wireless communication network, a cellular network, an Intranet, an Internet or the like, or any combination thereof. Network 104 may further include one, or any number of the exemplary types of networks mentioned above operating as a stand-alone network or in cooperation with each other.

The media provider 106 may be, for example, one or more websites hosted by one or more web servers, an image provider, a video provider, and/or other media providers for transmitting data to a user device 102. Also, the media provider 106 may be one or more personal websites, commercial websites, government websites, non-profit organization websites and/or other content websites.

The service provider 108 may be, for example, an Internet service provider (ISP) for providing a dial-up service, a digital subscriber line (DSL) service, an asymmetric digital subscriber line (ADSL), a broadband wireless access service, a cable service, an Ethernet service, an integrated services digital network service (ISDN); a fiber-optics service, an asynchronous transfer mode (ATM) service, a satellite Internet access service, synchronous optical network (SONET) service and/or other Internet service providers. In an exemplary embodiment, the service provider 108 may provide one or more probes 112 within the network 104 to monitor the Internet traffic associated with the user device 102. Also, the one or more probes 112 within the network 104 may be provided by a disparate entity (e.g., probe manager, probing service provider) from the service provider 108.

The behavioral tracking provider 110 may be, for example, but not limited to, a research company, a survey company, an advertising company, a spyware company, and/or other companies that collect user information. Also, the behavioral tracking provider 110 may include one or more behavioral tracking software to track user information for one or more behavioral tracking providers 110. For example, the one or more behavioral tracking software may be installed on the user device 102 without user's knowledge.

The probe 112 may be a monitoring device located at one or more monitoring points within the network 104. For example, one or more probes 112 may be associated with a user device 102. In an exemplary embodiment, the one or more probes 112 may be integrated (e.g., embedded, installed) with the user device 102. Also, the monitoring points may be any point in the network 104 that may provide a connection between the user device 102 to the media provider 106 and/or the behavioral tracking provider 110. The probe 112 may be a deep packet inspection (DPI) device, a port mirror, a tap and/or other devices that may monitor a data stream through the network 104. Also, the probe 112 may examine the data stream and/or one or more source codes associated with the data stream. Further, the probe 112 may perform one or more functions, for example, but not limited to, interception, policy definition and enforcement, quality of service (QoS), offering tiered services, and/or copyright enforcement. In an exemplary embodiment, the probe 112 may monitor Internet traffic transmitted and/or received by the user device 102.

Figure 2:
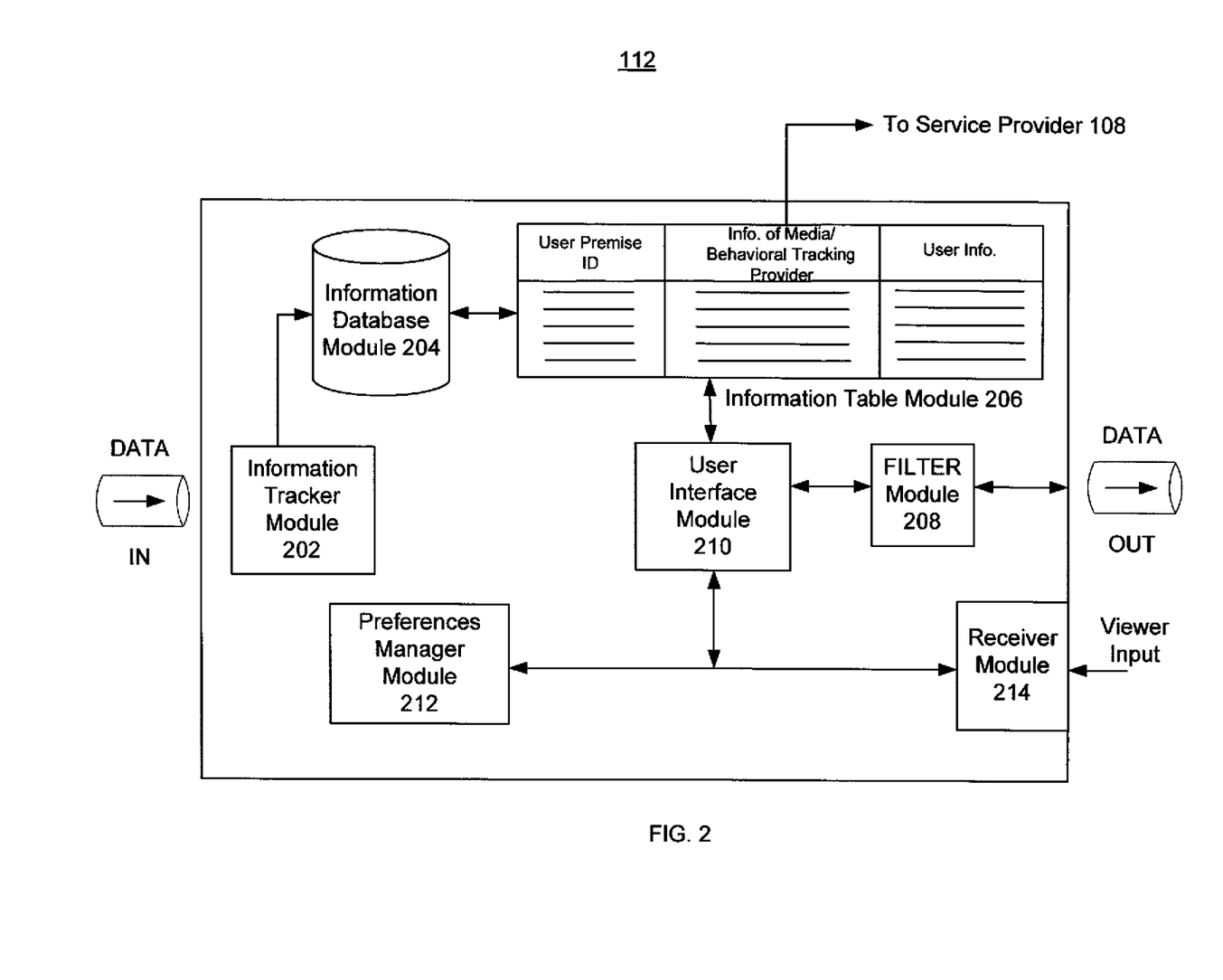
FIG. 2 illustrates various modules of a probe for controlling a passage of user information in accordance with exemplary embodiments.

FIG. 2 illustrates various modules of the probe 112 for controlling a passage of user information in accordance with exemplary embodiments. The probe 112 may include an information tracker module 202, an information database module 204, an information table module 206, a filter module 208, a user interface module 210, a preference manager module 212, and a receiver module 214. It is noted that the modules 202, 204, 206, 208, 210, 212, and 214 are exemplary and the functions performed by one or more of the modules may be combined with that performed by other modules. The functions described herein as being performed by the modules 202, 204, 206, 208, 210, 212, and 214 also may be separated and may be located and/or performed by other modules. Also, the function described herein being performed by the modules 202, 204, 206, 208, 210, 212, and 214 may be located and/or performed by the service provider 108.

The information tracker module 202 may include one or more processors to monitor and/or process a data stream between the user device 102 and the media provider 106. In an exemplary embodiment, a user may submit one or more requests/queries to the media provider 106 for one or more webpages associated with a website. The one or more requests/queries may include uniform resource locator (URL), keywords, search terms and/or other information to enable a user to request one or more webpages. The information tracker module 202 may monitor and/or detect the one or more requests/queries submitted by the user to the media provider 106. Also, the information tracker module 202 may track one or more visited websites provided by the media provider 106. For example, the information tracker module 202 may identify one or more websites based at least in part on the one or more requests/queries submitted by the user. The information tracker module 202 may track the information associated with one or more websites. The information associated with the one or more websites may include identification information (e.g., name of website, uniform resource locator (URL)), time (e.g., duration of the visit, time of the day), date, frequency of visit, one or more categories associated with the website, a type of information associated with the website, and/or other information associated with a website provided by the media provider 106. For example, a user may visit the Amazon website to purchase computer, television and/or telephone. The information tracker module 202 may identify that the user visited Amazon website on Apr. 8, 2008 for two hours and purchased computer, television and/or telephone.

Also, the information tracker module 202 may monitor and/or identify a behavioral tracking provider 110 associated with the media provider 106. In an exemplary embodiment, one or more behavioral tracking providers 110 may be associated with the media provider 106. The media provider 106 may participate in a behavioral tracking service provided by the behavioral tracking providers 110. A user associated with the user device 102 may obtain one or more webpages from the media provider 106, and the information tracker module 202 may monitor information associated with the behavioral tracking provider 110 contained in the one or more webpages. In an exemplary embodiment, tracking codes/contents may be embedded in the one or more webpages provided by the media provider 106. For example, the tracking codes/contents may be a pixel call, a web bug, a pixel tag, a clear GIF, web beacons and/or other tracking contents associated with the one or more webpages. The tracking codes/contents may contain an uniform resource locator (URL) associated with the behavioral tracking provider 110. Also, the tracking codes/contents may cause the user device 102 to communicate with the behavioral tracking provider 110. In an exemplary embodiment, the tracking codes/contents may cause the user device 102 to communicate a tracking request (e.g., HTTP request) to the behavioral tracking provider 110. The tracking request may contain user information (e.g., user behavior, one or more webpages visited, content of the webpages) collected by the behavioral tracking provider 110. Also, the tracking request may contain one or more cookies to identify the user device 102 and/or a user associated with the user device 102. The information tracker module 202 may detect the tracking request generated by the tracking codes/contents to identify the behavioral tracking provider 110, the one or more webpages associated with the behavioral tracking provider and/or the media provider 106.

Further, the information tracker module 202 may monitor and/or process a data stream between the user device 102 and the behavioral tracking provider 110. As mentioned above, a user may obtain one or more webpages provided by the media provider 106 having information associated with a behavioral tracking provider 110. The information tracker module 202 may identify the tracking request having one or more cookies associated with the behavioral tracking provider 110 and/or the user information contained in the uniform resource locator (URL). In an exemplary embodiment, the user may be new to the media provider 106 and/or the behavioral tracking provider 110. The tracking codes/contents contained in the one or more webpages provided by the media provider 106 may cause the user device 102 to make a tracking request to the behavioral tracking provider 110. Upon, receiving the tracking request, the behavioral tracking provider 110 may transmit a cookie to the user device 102 to identify the user device 102. The information tracker module 202 may detect and/or monitor the cookies transmitted by the behavioral tracking provider 110. Also, the uniform resource locator (URL) contained in the tracking codes/contents may contain various user information associated with a user of the user device 102. During a tracking request, the uniform resource locator (URL) containing user information may be communicated to the behavioral tracking provider 110. The information tracker module 202 may detect and/or monitor the user information communicated to the behavioral tracking provider 110 during the tracking request. In another exemplary embodiment, the information tracker module 202 may detect and/or monitor a transmission of user information by a spyware on the user device 102 to the behavioral tracking provider 110. For example, the spyware on the user device 102 may collect various user information (e.g., Internet surfing habits and/or websites visited). The user information collected by the spyware may be transmitted to the behavioral tracking provider 110 and the information tracker module 202 would detect and/or monitor such transmission.

For example, a user may visit the Amazon website to purchase a digital camera. A tracking code/content may be associated with (e.g., embedded in) the webpage of the Amazon website. The tracking codes/contents may cause the user device 102 to make a tracking request to a behavioral tracking provider 110 associated with the Amazon website. The behavioral tracking provider 110 associated with the Amazon website may provide a cookie to the user device 102 in the event that the user is new to the Amazon website and/or new to the behavioral tracking provider 110. The uniform resource locator (URL) contained in the tracking code/contents may contain the user information associated with visiting Amazon website (e.g., the user is interested in digital camera and digital camera accessories). The tracking codes/contents may generate a tracking request to cause the user device 102 to communicate with the behavioral tracking provider 110. During the tracking request, the user information and/or cookies associated with the user device 102 may be communicated to the behavioral tracking provider 110 associated with the Amazon website. The information tracker module 202 may detect and/or monitor the tracking request from the user device 102 to the behavioral tracking provider 110. The user information collected by the information tracker module 202 may include, for example, but not limited to a user history (e.g., previous websites visited), a user interest (e.g., interest in other electronic devices), a user behavior, and/or other user information associated with a user located at the user device 102. For example, the user history may include one or more websites visited by the user, a favorite list of websites associated with the user, a bookmark list of websites associated with the user and/or other historical user information. Also, the user interest may be categorized into a category, for example, but not limited to, sports, electronics, cars, books, outdoors and/or other categories associated with a media provider and/or a service provider. Further, the user behavior may include user's web surfing habits, user's television habits, websites frequently visited by the user, channels and/or programming watched by the user and/or other behavioral information associated the user.

Furthermore, the information tracker module 202 may determine and/or monitor communications between the media provider 106 and the behavioral tracking provider 110 based at least in part on a communication between the user device 102 and the media provider 106 and/or the behavioral tracking provider 110. For example, the behavioral tracking provider 110 may provide the user information collected by the behavioral tracking provider 110 to the media provider 106. The user information may allow the media provider 106 to provide one or more advertisements that may be interested by the user. The information tracker module 202 may determine communications between the media provider 106 and the behavioral tracking provider 110 based at least in part on the one or more advertisements provided by the media provider 106. Also, the user information may allow the media provider 106 to service one or more advertisers and/or provide customized content to the user associated with the user device 102.

In an exemplary embodiment, the information tracker module 202 may detect and/or monitor the data stream continuously or intermittently at a constant or variable sampling rate (e.g., once every second, ten seconds) as the data stream may transverse through the probe 112. The information tracker module 202 may create pointers indicating the start and end of each transmission in the data stream. The information tracker module 202 may store each transmission in a media table in the information table module 206, which is discussed in further detail below. Also, the information tracker module 202 may examine each transmission of the data stream (e.g., an Internet Protocol packet header) to identify a beginning and an ending of the transmission. In another exemplary embodiment, one or more filters (not shown) may be associated with the information tracker module 202 to filter the transmission of the data stream.

The information tracker module 202 may identify the user devices 102 monitored by the media provider 106 and/or the behavioral tracking provider 110. For example, the information tracker module 202 may generate one or more user identifications associated with the user device 102. The information tracker module 202 may assign a unique identification designation (e.g., user name, user account number, a hash number, user address) to each user device 102. Also, the information tracker module 202 may identify one or more user information identifications assigned to the user information transmitted by the user device 102. For example, the information tracker module 202 may assign the one or more user identifications associated with the user device 102 as the one or more user information identifications. Also, the information tracker module 202 may assign different user information identifications (e.g., user interest, category of user information) than the user identifications associated with the user device 102. The information tracker module 202 may further establish an association between the one or more user identifications associated with the user device 102 and the user information identifications associated with the user information transmitted by the user device 102.

In another exemplary embodiment, in the event that multiple users may be associated with the user device 102, the information tracker module 202 may assign disparate user identification associated with each of the multiple users. For example, the information tracker module 202 may assign an unique identification to multiple users associated with the user device 102. For example, the information tracker module 202 may assign information associated with the one or more users as their identification. The information associated with the one or more users may include user's name, user's account number, user's location, and/or other personal information associated with the user. Also, the one or more users may select the information tracker module 202 to assign a random identification to the one or more users in order to protect the privacy of the user. For example, the information tracker module 202 may assign an identification number (e.g., User 324) associated with the one or more users. The information tracker module 202 may assign an identification symbol (e.g., User symbol #$ %) and/or other randomly generated identification symbols.

The information tracker module 202 may transfer information associated with the media provider 106 and/or the behavioral tracking provider 110, user information collected by the behavioral tracking information and/or other information detected by the information tracker module 202 to the information database module 204. The information database module 204 may include one or more databases to store information provided by the information tracker module 202. In an exemplary embodiment, the information database module 204 may store the user device identification, information associated with the media provider 106 and/or the behavioral tracking provider 110 and/or the user information collected by the behavioral tracking provider 110 for a predetermined period of time (e.g., a day, a week, a month, a year). Also, a user and/or an administrator associated with the service provider 108 may select a period of time of storage. In another exemplary embodiment, the information database module 204 may buffer the information received from the information tracker module 202 to the information table module 206. The information database module 204 may determine a buffer time (e.g., a minute, a hour) of the information received from the information tracker module 202. Also, the user and/or the administrator associated with the service provider 108 may select a buffer time. The information database module 204 may transfer the information from the information tracker module 202 to the information table module 206.

Also, the information database module 204 may include one or more processors to process the information received from the information tracker module 202. For example, the information database module 204 may process the information received from the information tracker module 202 by sorting the user device identification, information associated with the media provider 106 and/or the behavioral tracking provider 110, and/or the user information collected by the behavioral tracking provider 110 into one or more tables. The one or more tables may include one or more columns and/or one or more rows. The one or more tables may include a column listing of the user device identification, a column listing of the information associated with the media provider 106 and/or the behavioral tracking provider 110, and/or a column listing of the user information collected by the behavioral tracking provider 110. Also, the one or more tables may categorize the information associated with the media provider 106 and/or the behavioral tracking provider 110 and the user information collected by the behavioral tracking provider 110 based at least in part on the user device identification. In addition, the information database module 204 may include various types of behavioral tracking (e.g., user behaviors being tracked) provided by the behavioral tracking provider 110. The information database module 204 may transfer the one or more tables to the information table module 206.

The information table module 206 may include one or more databases (not shown) to store the one or more tables. For example, the information table module 206 may store the one or more tables until a new/updated table may be generated. Also, the information table module 206 may store the one or more tables for a predetermined time and/or a time selected by a user or an administrator associated with the service provider 108.

The information table module 206 may provide the one or more tables to the user interface module 210 and/or the service provider 108. The service provider 108 may store the one or more tables and present the one or more tables to the user (e.g., via report, mail, email, account page). For example, the service provider 108 may present the one or more tables to the user via an Internet interface. The Internet interface may be a graphical user interface (GUI) (e.g., a web page, a web portal). Also, the service provider 108 may send the one or more tables to the user at a predetermined period of time (e.g., weekly, monthly, quarterly, yearly). For example, the service provider 108 may periodically send the one or more tables to a user via mail and/or an electronic mail. The user may review the information presented in the one or more tables and may provide feedback to revise obsolete and/or inaccurate information in the one or more tables.

Also, the user may access the one or more tables via the viewer interface module 210. In an exemplary embodiment, the viewer interface module 210 may cause the display of a graphical user interface (GUI) to prompt the user to input information to initialize, set up, provide feedback information (e.g., correct inaccurate information and/or update current information), and/or modify the filter module 208. The viewer interface module 210 may prompt the user to select one or more options associated with the filter module 208 to filter the user information collected by the media provider 106 and/or the behavioral tracking provider 110, and how to respond to feedback information received from the user. In an exemplary embodiment, the receiver module 214 may receive feedback information. The user interface module 210 may provide the user feedback information to the information table module 206. The information table module 206 may update the one or more tables based at least in part on the user feedback information. The information table module 206 also may provide the user feedback information to the information database module 204 and/or the service provider 108 to be stored. In another exemplary embodiment, the receiver module 214 may receive one or more selections of the user's tracking options. The user interface module 210 may transfer the selection of the user's tracking options to the filter module 208.

The filter module 208 may receive the selection of the user's tracking options from the user interface module 210. The filter module 208 may update a user's tracking options based at least in part on the received selection of the user's tracking options. In an exemplary embodiment, the filter module 208 may offer one or more tracking options to the user. The one or more tracking options may include a remove tracking option, a security tool option, a partial tracking option, a custom tracking option and/or a full tracking option. For example, the remove tracking option may allow a user to opt-out of being tracked by the media provider 106 and/or a behavioral tracking provider 110. The remove tracking option may allow the service provider 108 to block the tracking of the media provider 106 and/or the behavioral tracking provider 110. In an exemplary embodiment, the filter module 208 may block one or more tracking requests transmitted from the user device 102 to the media provider and/or the behavioral tracking provider 110. Also, a user may opt-out of being tracked by the media provider 106 and/or the behavioral tracking provider 110 via contracting with the service provider 108 (e.g., filing paperwork, and/or signing a do not track list). Moreover, a user may opt-out of being tracked by the media provider 106 and/or the behavioral tracking provider 110 by interact with the media provider 106 and/or the behavioral tracking provider 110. In an exemplary embodiment, the filter module 208 may provide one or more links associated with the media provider 106 and/or the behavioral tracking provider 110 to the user to allow the user to opt-out of being tracked by the media provider 106 and/or the behavioral tracking provider 110. Also, the filter module 208 may provide instructions to enable a user to opt-out of being tracked by the media provider 106 and/or the behavioral tracking provider 110. The security tool option associated with the filter module 208 may include one or more security tools (e.g., Norton™ software, McAfee™ software) to remove spyware and/or adware associated with the user device 102. The partial tracking option associated with the filter module 208 may allow the user to select a media provider, a behavioral tracking provider, a time period (e.g., 9 a.m. to 5 p.m.), a date (e.g., Monday to Friday), to track the user information transmitted from the user device 102. The custom tracking option associated with the filter module 208 may allow the user and/or an administrator associated with the service provider 108 to customize the tracking of the user by the media provider 106 and/or the behavioral tracking provider 110. For example, the user may customize the tracking by select one or more tracking categories (e.g., electronics, sports), user interests, types of websites, types of user information that may be tracked by the media provider 106 and/or the behavioral tracking provider 108. The full tracking option associated with the filter module 208 may allow the media provider 106 and/or the behavioral tracking provider 110 to track user device 102. In an exemplary embodiment, the filter module 208 may be set to a default tracking option, for example, full tracking option. The user may access the filter module 208 via the user interface module 210 to revise and/or change accordingly, after changing the default tracking option of the filter module 208.

In another exemplary embodiment, feedback information received via the receiver module 214 may be transferred to the preferences manager module 212. The preferences manager module 212 may include one or more database to store the feedback information received from the receiver module 214. Also, the preferences manager module 214 may include one or more processors to analyze the information received from the receiver module 214. The preferences manager module 212 may perform various analyses, such as, but not limited to, time series analysis, forensic analysis, and/or pattern matching analysis. For example, an administrator associated with the service provider 108 may select various types of data analyses to be performed. The administrator may select a time series data analysis where feedback information received at an earlier time may be compared with the current feedback information. Also, the administrator may select forensic data analysis where the feedback information collected in the past may be analyzed. Further, the administrator may select pattern matching analysis where patterns associated with the feedback information received in the past may be matched with the current feedback information. The preferences manager module 212 may summarize and aggregate information received from the receiver module 212 to provide a report of the user preferences and/or feedback information. Also, the preferences manager module 212 may provide the feedback information to the information table module 206 and/or the service provider 108 via the user interface module 210.

Figure 3:
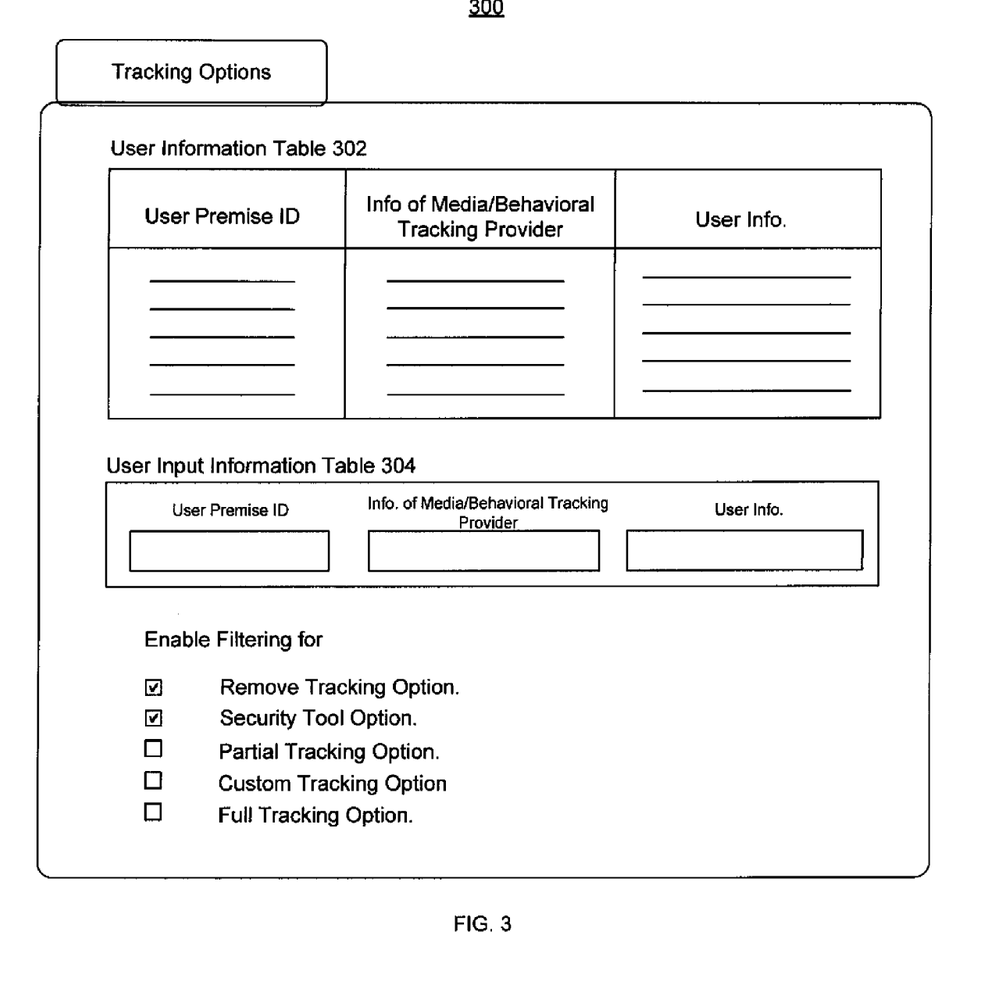
FIG. 3 illustrates a tracking options of a graphical user interface in accordance with exemplary embodiments.

FIG. 3 illustrates a tracking options graphical user interface in accordance with exemplary embodiments. The user interface module 210 may present the tracking options graphical user interface 300 to prompt the user to set the parameters of the filter module 208 for filtering the user information transmitted from the user device 102 to the media provider 106 and/or the behavioral tracking provider 110. In an exemplary embodiment, the tracking options graphical user interface 300 may prompt the user to enter feedback information and/or a tracking option for the filter module 208. The user may use an input device (e.g., remote control, keyboard) to enter feedback information and/or a tracking option (e.g., press a number key on a remote control, on a keyboard). For example, the tracking options graphical user interface 300 may include a user information table 302 displaying one or more behavioral tracking providers 110 tracking the user and/or information collected by the one or more behavioral tracking provider 110. Also, the user information table 302 may identify one or more media providers 106 associated with one or more behavioral tracking providers 110 that are tracking the user device 102. For example, the user information table 302 may display that a first behavioral tracking provider is tracking the user on Amazon.com and a second behavioral tracking provider is tracking the user on eBay.com. In addition, the user information table 302 may display one or more advertisements received by the user. Also, the user information table 302 may display one or more behavioral tracking providers which may generate the one or more advertisements received by the user.

Also, the tracking options graphical user interface 300 may prompt the user to provide feedback information via a user input information table 304. For example, the user input information table 304 may include one or more feedback inputs. The user may provide feedback information to the user device identification, the information associated with the media provider 106 and/or the behavioral tracking provider 110 and/or the user information collected by the behavioral tracking provider 110. For example, a user may select a different user device identification by entering a new user device identification (e.g., user name, user information) into the user input information table 304. Also, a user may select one or more media providers 106 and/or behavioral tracking providers 110 allowed to track the user by inputting a name of the media provider 106 and/or the behavioral tracking provider 110 into the user input information table 304. In addition, a user may provide current and/or accurate user information to the user input information table 304 in order to allow the behavioral tracking provider 110 to provide user interested advertisements. In an exemplary embodiment, the media provider 106 and/or the behavioral tracking provider 110 may create a user profile including various user interests, user behaviors, and/or other user information associated with the user. The user may provide the current and/or accurate user information via the input information table 304 to update the user profile created by the media provider and/or the behavioral tracking provider 110. For example, a user profile created by the media provider 106 and/or the behavioral tracking provider 110 may list that the user is shopping for a new car and/or looking for a loan. In the event that the user is no longer looking for a loan, the user may delete looking for a loan from the user profile created by the media provider 106 and/or the behavioral tracking provider 110.

Further, the tracking options graphical user interface 300 may allow the user to select one or more tracking options. In an exemplary embodiment, the tracking options graphical user interface 300 may prompt the user to select one or more options including a remove tracking option, a security tool option, a partial tracking option, a custom tracking option and/or a full tracking option.

The feedback information entered at the tracking options graphical user interface 300 may be stored by the information table module 206, information database module 204, preferences manager module 212, and/or the service provider 108. In an exemplary embodiment, the user interface module 210 may communicate the feedback information entered at the tracking options graphical user interface 300 to the preferences manager module 212.

Figure 4:
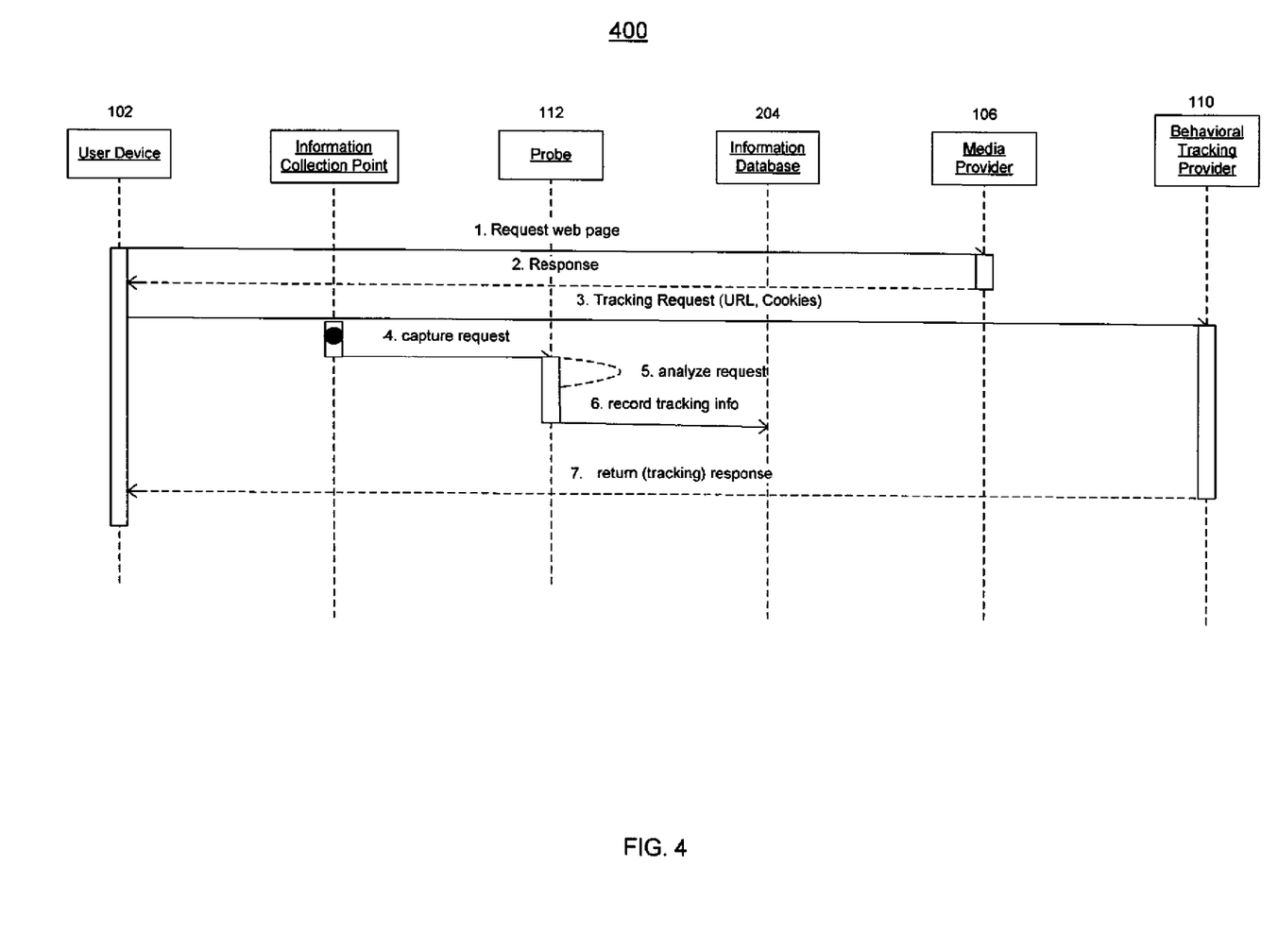
FIG. 4 illustrates a sequence diagram of components communication for a system of controlling a passage of user information in accordance with exemplary embodiments.

FIG. 4 illustrates a sequence diagram of components communication for a system of controlling a passage of user information in accordance with exemplary embodiments. In an exemplary embodiment, a user associated with the user device 102 may transmit a request for a webpage associated with the media provider 106. In response to the user's request, the media provider 106 may provide the one or more requested webpages to the user associated with user device 102. In an exemplary embodiment, a behavioral tracking provider 110 may provide a tracking service for the media provider 106. The one or more requested webpages provided by the media provider 106 may include one or more tracking codes/contents. In an exemplary embodiment, the one or more tracking codes/requests may be embedded in the one or more requested webpages. The one or more tracking codes/contents may include an uniform resource locator (URL) associated with the behavioral tracking provider 110. The one or more tracking codes/contents may be an one pixel image (e.g., transparent graphic image) to cause the user device 102 to make a tracking request to the behavioral tracking provider 110. The user device 102 may make the tracking request to the behavioral tracking provider 110 based at least in part on the uniform resource locator (URL) contained in the tracking code/content to the behavioral tracking provider 110.

The behavioral tracking provider 110 may respond to the request from the user device 102 by returning the one pixel image contained in the pixel call to cause the user device 102 to communicate with the behavioral tracking provider 110 automatically. In the event that the user device 102 may be a new user to the media provider 106 and/or the behavioral tracking provider 110, the behavioral tracking provider 110 may transmit one or more cookies to the user device 102 to subsequently identify and/or track activities associated with the user device 102. Also, in the event that the user device 102 may be an existing user to the media provider 106 and/or the behavioral tracking provider 110, one or more existing cookies may be associated with the user device 102. Thereafter, user information may be communicated from the user device 102 to the behavioral tracking provider 110 during the tracking request transmitted from the user device 102 to the behavioral tracking provider 110. For example, during the tracking request, the user information contained in the uniform resource locator (URL) and/or cookies associated with the user device 102 may be communicated to the behavioral tracking provider 110.

The behavioral tracking provider 110 may identify the user device 102 and/or the user information communicated by the user device 102 based at least in part on the one or more cookies. In an exemplary embodiment, a user may visit various websites (e.g., Yahoo.com, Amazon.com) and these various websites may be associated with one or more behavioral tracking providers. The webpage of these various websites may include one or more tracking codes/contents and may cause a user device to communicate with the one or more behavioral tracking providers. Therefore, the one or more behavioral tracking providers 110 may communicate with the user device 102 based at least in part on the one or more tracking codes/contents and may enable the one or more behavioral tracking provider 110 to collect user information.

As illustrated in FIG. 4, the transmission of the tracking request to the behavioral tracking provider 110 based on the one or more tracking codes/contents may be detected at one or more information collection points within the network 104. For example, the probe 112 may be located at one or more information collection points within the network 104. The probe 112 may capture the tracking request and/or the user information communicated by the tracking request to the behavioral tracking provider 110. For example, the tracking request may include information associated with the content of one or more websites, categories of user information (e.g., sports, car, electronics), user profile, user interests and/or other information associated with the user located at the user device 102. Also, the tracking request may include one or more cookies associated with the user device 102 in order for the behavioral tracking provider 110 to identify and/or track the activities of the user device 102. Moreover, the probe 112 may monitor the tracking request communicated from the user device 102 to the behavioral tracking provider 110 and determine the one or more media providers 106 that transmitted the one or more tracking codes/contents. In addition, the probe 112 may analyze the captured information and stored the analyzed information in the information database module 204 and/or the information table module 206.

Figure 5:
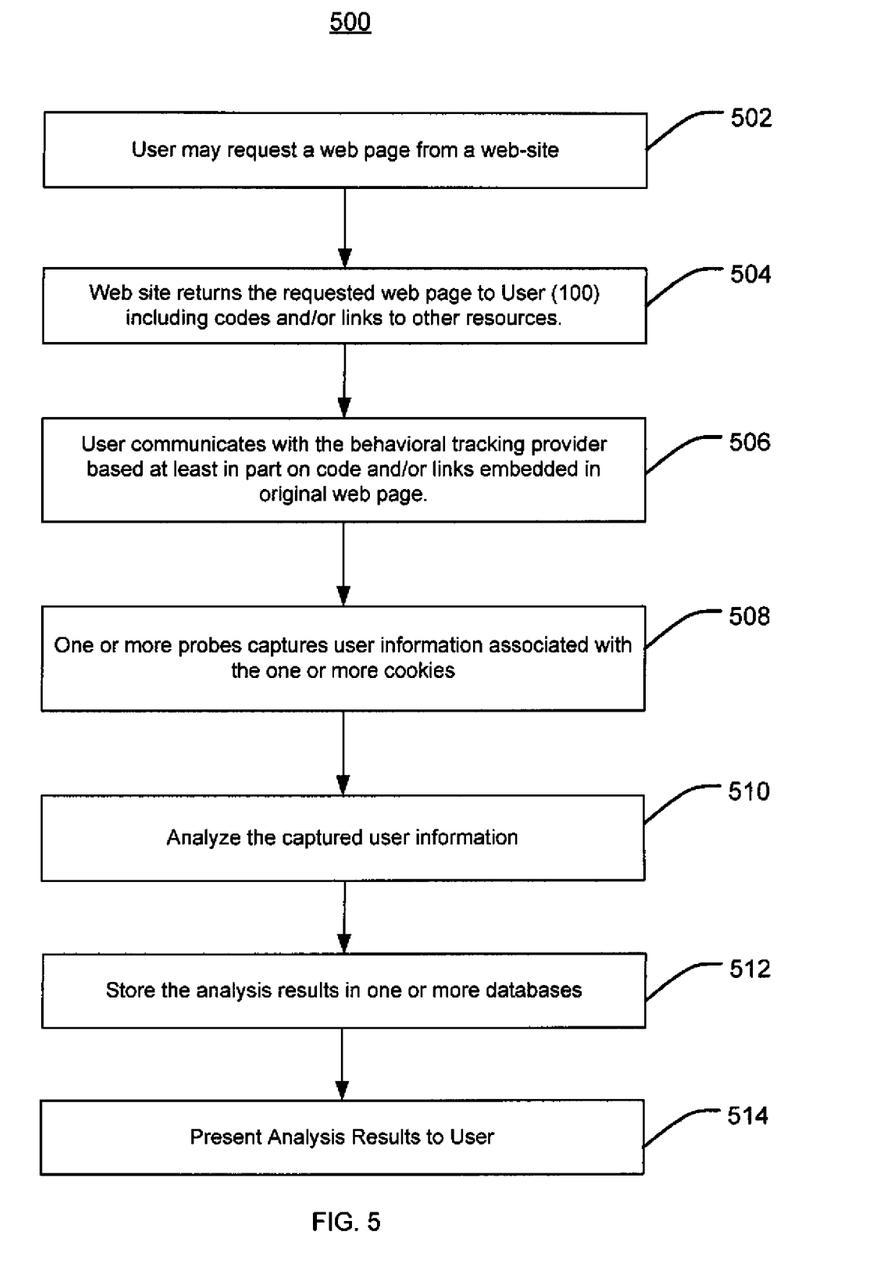
FIG. 5 illustrates a flow diagram of a method for controlling a passage of user information in accordance with exemplary embodiments.

FIG. 5 illustrates a flow diagram of a method for controlling a passage of user information in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

At block 502, a user may request one or more webpages from a website provided by the media provider 106 via the network 104. For example, a user may utilize the user device 102 to request a website by entering an address associated with the website (e.g., uniform resource locator (URL)). The computer may transfer the address associated with the website to the media provider 106 over the network 104. Also, the user may utilize a mobile user device 102 to request one or more webpages. In an exemplary embodiment, the user may enter www.Amazon.com to request one or more webpages from the Amazon website. The method 500 may continue to block 504.

At block 504, the media provider 106 may return the requested one or more webpages from the website, wherein the returned one or more webpages may include one or more codes and/or links to other resources. For example, the one or more codes and/or links to other resources may be one or more tracking codes/contents. The one or more tracking codes/contents may cause the user device 102 to communicate with the behavioral tracking provider 110. In an exemplary embodiment, the user may request one or more webpages from the Amazon website and the returned one or more webpages may include one or more tracking codes/contents. The one or more tracking codes/contents may be a transparent image associated with the returned one or more webpages. The returned one or more webpages may contain information associated with an digital camera and the one or more tracking codes/contents may be a portion of the digital camera image and/or a portion of the webpage background. The method 500 may continue to block 506.

At block 506, the user associated with the user device 102 may communicate with the behavioral tracking provider 110 (e.g., knowingly or unknowingly) based at least in part on the one or more tracking codes/contents. For example, the user associated with the user device 102 may be a new user to the behavioral tracking provider 110, the behavioral tracking provider 110 may provide one or more cookies to the user device 102 in order to identify the user device 102. Also, the user associated with the user device 102 may be an existing user to the behavioral tracking provider 110, and the user device 102 may contain one or more existing cookies. In an exemplary embodiment, the one or more tracking codes/contents may include an uniform resource locator (URL) having user information. Also, the one or more tracking codes/contents may generate a tracking request to cause the user device 102 to communicate with the behavioral tracking provider 110. The tracking request may communicate the user information contained in the uniform resource locator (URL) and/or the cookies associated with the user device 102 to the behavioral tracking provider 110. The method 500 may continue to block 508.

At block 508, during the transmission of the tracking request generated by the tracking codes/contents from the user device 102 to the behavioral tracking provider 110 over network 104, one or more probes 112 located in the network 104 may capture user information associated with the tracking request. The one or more probes 112 located in the network 104 may store the captured user information or transfer the captured user information to the service provider 108 and stored. The captured user information may include target domain, requested uniform resource locator (URL), referrer uniform resource locator (URL), user interests, user profile and/or other information associated with the user associated with the user device 102. The method 500 may continue to block 510.

At block 510, the one or more probes 112 and/or the service provider 108 may analyze the captured user information. For example, one or more probes 112 and/or the service provider 108 may analyze the captured user information to identify one or more behavioral tracking provider 110 associated with a website. In an exemplary embodiment, the one or more probes 112 may identify a behavioral tracking provider 110 associated with the Amazon website. Also, the one or more probes 112 may analyze the captured user information to identify a method of tracking user information by the behavioral tracking provider 110. In an exemplary embodiment, the one or more probes 112 may identify various types of user information collected by the behavioral tracking provider 110 to determine an importance of various types of user information. The method 500 may continue to block 512.

At block 512, the one or more probes 112 may store the analysis results in one or more databases. For example, the analysis results may be stored in the information database module 204. Also, the analysis results may be stored in a table format in the information table module 206. In addition, the analysis results may be provided to the service provider 108 and stored. The method 500 may continue to block 514.

At block 514, the one or more probes 112 may present the analysis results to the user device 102. For example, the user may log into an interface provided by the service provider 108 to access the analysis results and/or modify the user information. Also, one or more options of monitoring the user information may be presented to the user. In an exemplary embodiment, the user may opt-out of the tracking by the behavioral tracking provider 110. Also, the user may be provided with one or more security tools to remove spyware and/or adware and/or opt-out of being tracked by the media provider 106 and/or the behavioral tracking provider 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
monitoring, via an information tracker module comprising at least one processor, a data stream between a user device and a media provider, wherein the data stream comprises one or more requests for one or more webpages;
identifying, via the information tracker module, a behavioral tracking provider associated with the media provider, wherein the identifying is based, at least in part, on information comprised in the one or more webpages, wherein the information comprised in the one or more webpages comprises one or more tracking codes embedded in the one or more webpages;

receiving, via the information tracker module, a tracking request from the user device to the behavioral tracking provider, wherein the tracking request comprises user identification information and is generated based, at least in part, on the one or more tracking codes;

capturing, via the information tracker module, user information while the user information is being transmitted via a data stream between the user device and the identified behavioral tracking module, wherein the user information is associated with the user identification information;

analyzing, via an information database module comprising at least one electronic database, the user information to determine one or more relationships between the user device, the media provider, the one or more webpages, and the behavioral tracking provider; and outputting, via a user interface module, the one or more relationships to the user device.

2. The method of claim 1, wherein the user identification information comprises one or more cookies to identify the user device or a user associated with the user device.

3. The method of claim 1, wherein the one or more relationships comprise at least one of the behavioral tracking provider tracking the user device, the user information collected by the behavioral tracking provider, the website visited by the user device, one or more advertisements received by the user device, and the website associated with the behavioral tracking provider.

4. The method of claim 1, wherein outputting the one or more relationships to the user device comprises presenting the one or more relationships to the user device via at least one of an interface and a portal.

5. The method of claim 1, further comprising presenting one or more tracking control options to the user device, wherein the one or more tracking control options comprise at least one of: a remove tracking option, a security tool option, a partial tracking option, a custom tracking option, and a full tracking option.

6. The method of claim 1, wherein the one or more tracking codes comprise: a pixel call, a web bug, a pixel tag, a clear Graphics Interchange Format (GIF), web beacons, a Uniform Resource Locator (URL), and tracking contents associated with the one or more webpages.

7. The method of claim 1, further comprising updating the captured user information, wherein the updating the captured user information comprises inputting the updated user information via a user interface.

8. The method of claim 1, further comprising:
monitoring, via the information tracker module, user information transmitted by spyware on the user device to the behavioral tracking provider.

9. A non-transitory computer readable media comprising code to perform the acts of the method of claim 1.

10. A system comprising:
an information tracker module comprising at least one processor, configured to:
monitor a data stream between a user device and a media provider, wherein the data stream comprises one or more requests for one or more webpages,
identify a behavioral tracking provider associated with the media provider, wherein the identifying is based, at least in part, on information comprised in the one or more webpages wherein the information comprised in the one or more webpages comprises one or more tracking codes embedded in the one or more webpages,
receive a tracking request from the user device to the behavioral tracking provider, wherein the tracking request comprises user identification information and is generated based, at least in part, on the one or more tracking codes, and
capture user information while the user information is being transmitted via a data stream between the user device and the identified behavioral tracking provider, wherein the user information is associated with the user identification information, an information database module comprising at least an electronic database, configured to:
store user information transmitted during the monitored communications, and
analyze the user information to determine one or more relationships between the user device, the media provider, the one or more webpages, and the behavioral tracking provider; and
an user interface module configured to output the one or more relationships to the user device.

11. The system of claim 10, wherein the user identification information comprises one or more cookies to identify the user device or a user.

12. The system of claim 10, wherein the one or more relationships comprises at least one of the behavioral tracking provider tracking the user device, the user information collected by the behavioral tracking provider, the website visited by the user device, one or more advertisement received by the user device, and the website associated with the behavioral tracking provider.

13. The system of claim 10, wherein the user interface module is configured to output the one or more relationships to the user device by at least presenting the one or more relationships to the user device via at least one of an interface and a portal.

14. The system of claim 10, further comprising a filter module configured to present one or more tracking options to the user device, wherein the one or more tracking options comprise at least one of: a remove tracking option, a security tool option, a partial tracking option, a custom tracking option and a full tracking option.

15. The system of claim 10, wherein the one or more tracking codes comprise: a pixel call, a web bug, a pixel tag, a clear Graphics Interchange Format (GIF), web beacons, a Uniform Resource Locator (URL), and tracking contents associated with the one or more webpages.

16. The system of claim 10, further comprising a preferences manager module configured to store updated user information and a receiver module configured to receive the updated user information.

17. The system of claim 16, wherein the information tracker module is further configured to monitor user information transmitted by spyware on the user device to the behavioral tracking provider.

18. The system of claim 10, wherein the information tracker module is implemented as, at least one of: a probe, a Deep Packet Inspection (DPI) device, a port mirror, a tap, and a data stream monitoring device.

* * * * *